No. 705,833. Patented July 29, 1902.
P. W. GEE.
GENEALOGICAL CHAIN RECORD.
(Application filed Apr. 1, 1901. Renewed Dec. 19, 1901.)
(No Model.)

Witnesses:
J. B. McGirr.
Peter A. Ross.

Inventor:
Pattie Williams Gee
By Henry Connett
Attorneys

UNITED STATES PATENT OFFICE.

PATTIE WILLIAMS GEE, OF NEW YORK, N. Y.

GENEALOGICAL CHAIN RECORD.

SPECIFICATION forming part of Letters Patent No. 705,833, dated July 29, 1902.

Application filed April 1, 1901. Renewed December 19, 1901. Serial No. 86,535. (No model.)

*To all whom it may concern:*

Be it known that I, PATTIE WILLIAMS GEE, a citizen of the United States, residing in the borough of Manhattan and city, county, and State of New York, have invented certain new and useful Improvements in Genealogical Chain Records, of which the following is a specification.

This invention relates to devices for preserving a family or genealogical record; and it has for its object to provide such a record made up by forming a record-chain composed of elements each of which is an individual or personal record. Each direct ancestor of an individual is provided for by these elements. Notes and references as to collateral branches may be made on the reverse sides of the elements.

Figure 1:
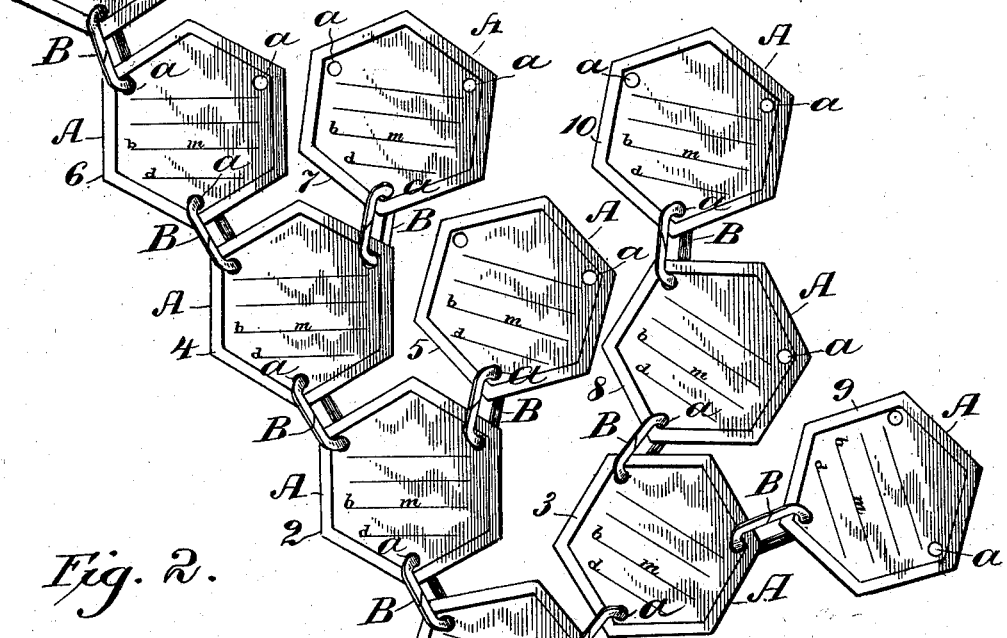
Figure 2:
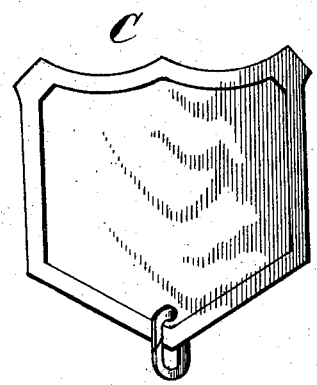
Figure 3:
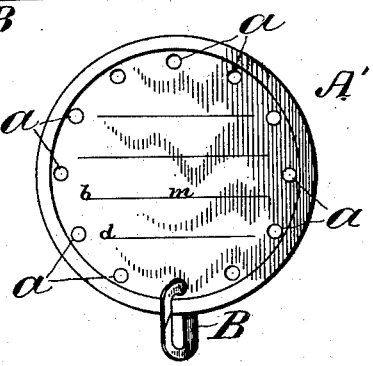

In the drawings, which serve to illustrate my invention, Figure 1 is a view showing a chain record embodying my improvements. Fig. 2 shows an element suitable for having the family arms emblazoned or inscribed thereon. Fig. 3 shows an element of circular form detached.

In Fig. 1 the elements of individual records A of the chain are represented as of hexagon form, each of some suitable thin material capable of receiving an inscription. For example, it may be of cardboard or celluloid with a light metal frame or border. In it are three holes $a$ to receive open links B for loosely coupling the elements together. The lines and letters "b," "m," and "d" on the element are for convenience in writing thereon the name and the dates of birth, marriage, and death of the individual.

C designates a terminal element upon which may be blazoned the family arms, if desired.
In order to more conveniently explain the manner of using and making up the record, the elements A are numbered in Fig. 1—that is, in the example shown 1 is the element representing the individual compiling the record; 2, the element of the father; 3, the element of the mother; 4 and 5, the paternal grandfather and grandmother; 6 and 7, the paternal great-grandfather and great-grandmother; 8 and 9, the maternal grandfather and grandmother, and 10 the maternal great-grandfather.

Of course the line may be continued back as far as known or desired by simply coupling on additional elements.

The male and female elements may be of different colors, if desired, so as to more readily distinguish them, or the maternal ancestors may all have elements of a different color from those of the male line.

Where it is desired to make up a chain-record showing a single progenitor and all of his descendants, the elements may of course have more holes $a$, as indicated in Fig. 3. The invention is not limited in this respect nor as to the size, contour, and materials of the elements.

The open link B is convenient for coupling together the elements; but the invention is not limited to this specific form of coupling device.

The advantage of the chain record is that the manner of coupling the individual elements together makes the relationship of the individuals to each other apparent at a glance. As each individual descends from two individuals, the three apertures $a$ for connecting the elements will be apparent when the chain is made up to show the ancestry of an individual, as in Fig. 1.

The element C is not, of course, essential to the record; but the final element of each family line may bear the arms of that line. The link B' of the element A numbered 1 may be any form of suspending link or hook.

Ordinarily the elements will be coupled in multiples rather than series—that is to say, each element is coupled to two or more other elements and not merely in series, like the links in a common chain.

Having thus described my invention, I claim—

1. A genealogical chain record having as record devices for each individual of the family, a series of record elements adapted for receiving inscriptions, said elements being loosely coupled together in multiple and each element having about its margin a plurality of holes to receive the coupling devices.

2. A genealogical chain record having as record devices for each individual of a family, a series of flat or disk-like record elements adapted for receiving inscriptions and open chain-links loosely coupling together said record elements, the elements having a plurality of holes in their margins to receive said open links.

3. A genealogical chain record composed of disk-like or flat elements coupled loosely together and adapted to receive inscriptions, each of said elements having three coupling-apertures, and means for coupling said elements together.

In witness whereof I have hereunto signed my name, this 22d day of March, 1901, in the presence of two subscribing witnesses.

PATTIE WILLIAMS GEE.

Witnesses:
   PETER A. ROSS,
   F. D. DIMAN.